United States Patent
Lower

(10) Patent No.: US 7,661,479 B2
(45) Date of Patent: Feb. 16, 2010

(54) SUBSEA INSULATING SHROUD

(75) Inventor: J. Donald Lower, Houston, TX (US)

(73) Assignee: Duron Systems, Inc., Houston, TX (US)

( * ) Notice: Subject to any disclaimer, the term of this patent is extended or adjusted under 35 U.S.C. 154(b) by 583 days.

(21) Appl. No.: 11/136,902

(22) Filed: May 25, 2005

(65) Prior Publication Data

US 2006/0266523 A1 Nov. 30, 2006

(51) Int. Cl.
*E21B 29/12* (2006.01)
(52) U.S. Cl. .................. 166/360; 166/368; 166/302; 166/345; 138/149
(58) Field of Classification Search .................. 166/338, 166/345, 356, 360, 368; 405/224.4, 169; 138/149
See application file for complete search history.

(56) References Cited

U.S. PATENT DOCUMENTS

| 948,329 | A | * | 2/1910 | Hunting | 166/75.13 |
|---|---|---|---|---|---|
| 3,063,500 | A | * | 11/1962 | Logan | 166/351 |
| 3,749,429 | A | * | 7/1973 | Hauber | 403/403 |
| 4,258,794 | A | * | 3/1981 | Sizer et al. | 166/356 |
| 4,273,472 | A | * | 6/1981 | Piazza et al. | 405/211 |
| 4,300,373 | A | * | 11/1981 | Camos et al. | 70/232 |
| 4,366,970 | A | * | 1/1983 | Hogan, Jr. | 285/45 |
| 4,457,448 | A | * | 7/1984 | Beagell | 220/327 |
| 4,715,439 | A | * | 12/1987 | Fleming | 166/68 |
| 4,797,117 | A | * | 1/1989 | Ayers | 439/200 |
| 6,049,657 | A | * | 4/2000 | Sumner | 392/469 |
| 6,079,452 | A | * | 6/2000 | Touzel et al. | 138/149 |
| 6,264,401 | B1 | * | 7/2001 | Langner et al. | 405/169 |
| 6,284,809 | B1 | * | 9/2001 | Plummer et al. | 521/54 |
| 6,292,627 | B1 | * | 9/2001 | Gilchrist et al. | 392/311 |
| 6,315,497 | B1 | * | 11/2001 | Wittman et al. | 405/158 |
| 6,316,751 | B1 | * | 11/2001 | Wyke et al. | 219/535 |
| 6,349,976 | B1 | * | 2/2002 | Taylor, Jr. | 285/123.1 |
| 6,371,693 | B1 | * | 4/2002 | Kopp et al. | 405/158 |
| 6,415,868 | B1 | * | 7/2002 | Janoff et al. | 166/368 |
| 6,520,261 | B1 | * | 2/2003 | Janoff et al. | 166/350 |
| 6,571,878 | B2 | * | 6/2003 | Mc Daniel et al. | 166/367 |
| 6,688,900 | B2 | * | 2/2004 | Bass et al. | 439/191 |
| 6,837,311 | B1 | * | 1/2005 | Sele et al. | 166/353 |
| 6,869,253 | B2 | * | 3/2005 | Biolley | 405/224.3 |
| 6,889,770 | B2 | * | 5/2005 | Qvam et al. | 166/356 |
| 7,226,243 | B2 | * | 6/2007 | Lee et al. | 405/154.1 |
| 2005/0167978 | A1 | * | 8/2005 | Moses et al. | 285/223 |
| 2008/0029270 | A1 | * | 2/2008 | Wong et al. | 166/338 |
| 2008/0063478 | A1 | * | 3/2008 | Reddy | 405/154.1 |

FOREIGN PATENT DOCUMENTS

GB 2165910 A * 4/1986
WO WO 9837355 A1 * 8/1998

* cited by examiner

*Primary Examiner*—Thomas A Beach
(74) *Attorney, Agent, or Firm*—Conley Rose, P.C.

(57) ABSTRACT

Apparatus and methods for insulating a connector that connects a first tubular member having a first flange with a second tubular member having a second flange. The apparatus comprises a generally tubular body forming a generally tubular cavity therein adapted to enclose the connector. The body has a longitudinal opening adapted to receive the first tubular member and a closure member for closing said opening. The body and the closure member are lined with insulation and include first and second seals for sealing with the first and second flanges so as to seal around the connector.

24 Claims, 6 Drawing Sheets

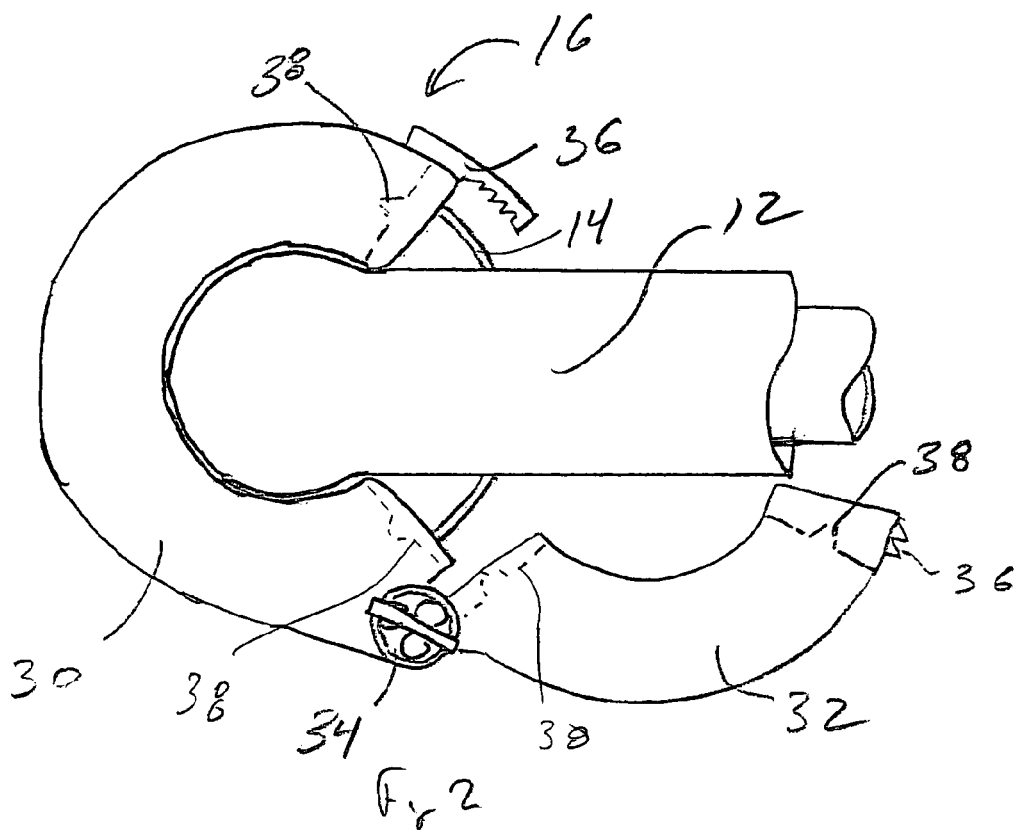
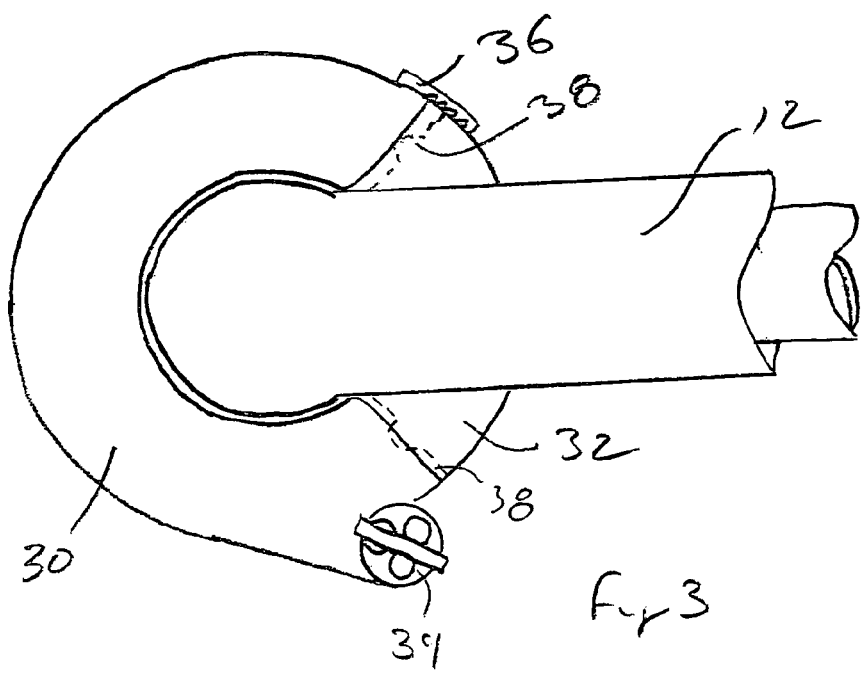

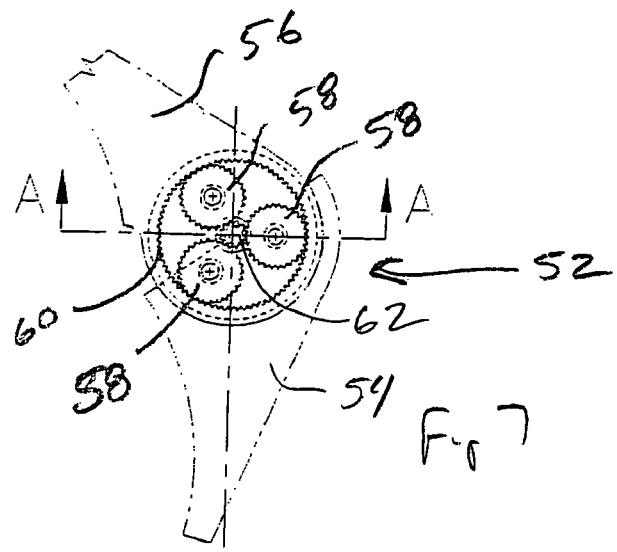
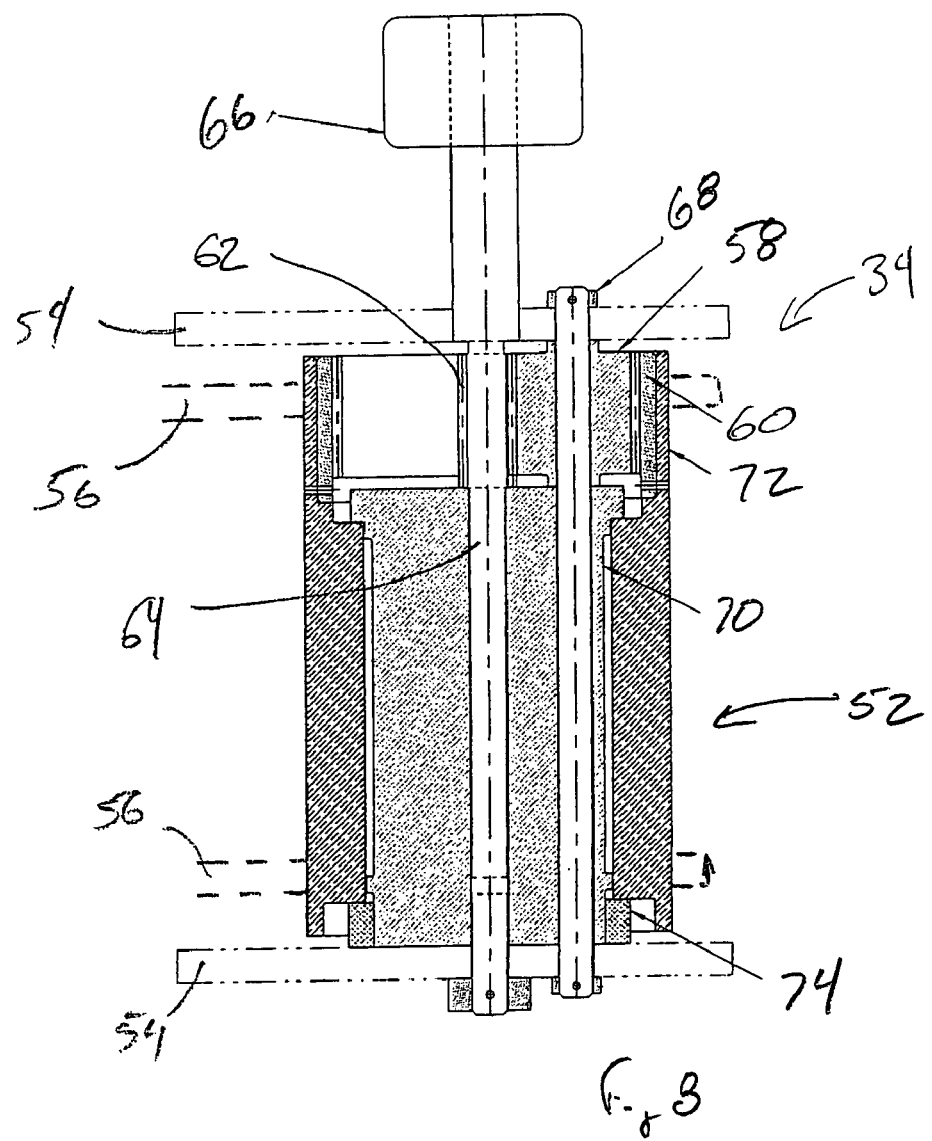

SUBSEA INSULATING SHROUD

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

The present invention relates generally to apparatus for insulating hydrocarbon production equipment in a subsea environment. More specifically, the present invention relates to apparatus for insulating subsea connectors for flowlines, jumpers, umbilicals, and other tubular members.

Production equipment, such as manifolds and trees, that are used in producing oil and gas in a subsea environment are usually interconnected by flowlines, or other tubulars. The flowlines provide fluid communication to support the flow of production fluids, control fluids, and other fluids. In the subsea environment, the equipment is often exposed to temperature at or only slightly above the freezing point of water.

Although the fluids extracted from subsea wells are often at an elevated temperature when leaving the well, the fluids can cool as they move through the production equipment and flowlines. This cooling is especially problematic during an interruption in flow where temperatures can decrease to a point where flow will be impeded, such as by the formation of hydrates. In order to decrease the rate at which the fluid cools, thermal insulation is often installed on and around the production equipment and flowlines.

One area of difficulty in providing thermal insulation is at the connections between the production equipment and the flowlines. The flowlines are typically installed after the production equipment is on the seabed, with the connections between the flowlines and the production equipment made by remotely operated vehicles (ROV) or some other remotely operated device. Therefore, any thermal insulation must allow for remotely controlled installation of the connector or be able to be installed after the connection is made.

Insulation used in subsea environments must be able to withstand the high hydrostatic pressures found in deep water applications. Conventional insulation used for subsea systems provides very little compressibility so as to better withstand hydrostatic pressure. When installing insulating systems subsea, water often becomes trapped by the insulation. When this water is heated it expands and may tend to damage the insulation or create circulation paths for cold water to seep under the insulation.

Thus, there remains a need to develop methods and apparatus for thermally insulating flowline connectors, which overcome some of the foregoing difficulties while providing more advantageous overall results.

SUMMARY OF THE PREFERRED EMBODIMENTS

The embodiments of the present invention are directed toward methods and apparatus for insulating a connector that connects a first tubular member having a first flange with a second tubular member having a second flange. The apparatus comprises a generally tubular body forming a generally tubular cavity therein adapted to enclose the connector. The body has a longitudinal opening adapted to receive the first tubular member and a closure member for closing said opening. The body and the closure member are lined with insulation and include first and second seals for sealing with the first and second flanges so as to seal around the connector.

A method of insulating a connector comprises receiving a flow line through a longitudinal opening in a insulating shroud. The insulating shroud is lowered around the connector and sealingly engaging flanges on each side of the connector to seal around the connector. A closure member closes the opening is latched closed. Insulation on the insulating shroud is compressed as water that is trapped around the connector in a cavity in the insulating shroud is heated and expands.

Thus, the present invention comprises a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIG. 2 is a top view of an insulating shroud assembly being installed on a connector;

FIG. 3 is a top view of an insulating shroud assembly installed on a connector;

FIG. 7 is a top view of a drive mechanism;

FIG. 8 is a cross-sectional view of the drive mechanism of FIG. 7;

DETAILED DESCRIPTION OF THE PREFERRED EMBODIMENTS

Figure 1:
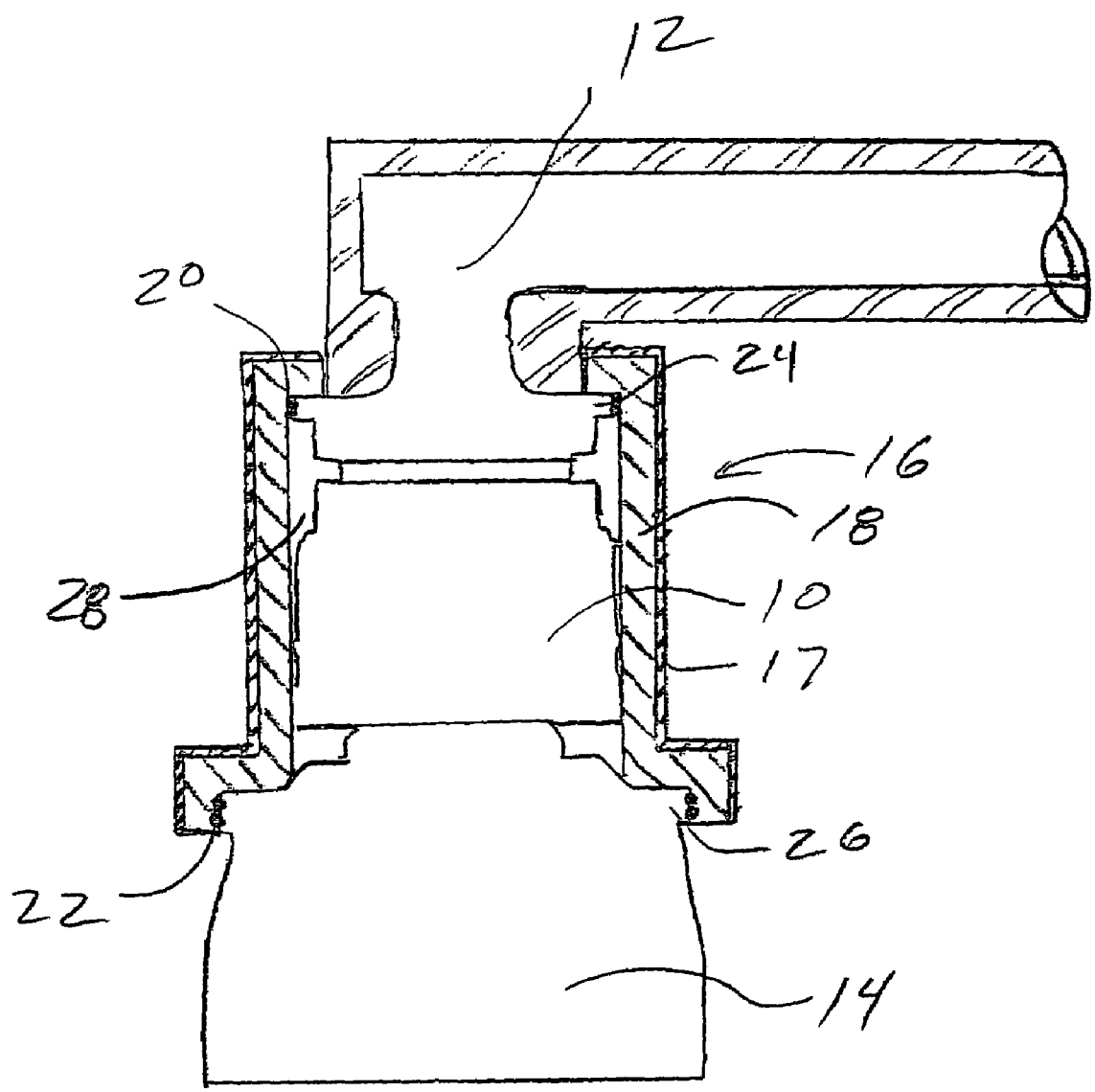
FIG. 1 is cross-sectional view of a flowline jumper connector with an insulation assembly installed thereon.

Referring now to FIG. 1, a flowline jumper connector 10 joins a flowline jumper 12 to a manifold 14. Insulating shroud assembly 16 surrounds and extends above and below connector 10. Insulating shroud assembly 16 comprises outer shell 17, insulation 18, upper seal 20, and lower seal 22. Upper seal 20 sealingly engages flange 24 on flowline jumper 12. Lower seal 22 sealingly engages flange 26 of the connector support structure on manifold 14. Thus, seals 20 and 22 form an insulated volume 28 that surrounds connector 10.

Outer shell 17 is generally tubular forming a cavity therewithin. Outer shell 17 is formed from a hard plastic material or some other non-compliant, corrosion-proof material. Insulation 18 is a flexible insulation molded onto the inner surface of outer shell 17. Insulation 18 may be held in place by a plurality of plastic pins that are connected to outer shell 17 and molded into insulation 18. In certain embodiments, outer shell may be approximately 0.5 inches thick and insulation 18 is preferably at least 1.5 inches thick. When insulating shroud assembly 16 is installed, water is trapped within insulated volume 28. This water will expand, by approximately 10% by volume, when heated by the fluid flowing through connector 10. Insulation 18 preferably has a volume at least equal to the volume of water that will be trapped within volume 28.

Insulation 18 is sufficiently compressible so as to absorb the expansion of the water without damaging outer shell 17. Thus, insulation 18 is formed from a material that can support compression both from hydrostatic pressure and from expansion of the water trapped within insulated volume 28 while maintaining sufficient insulating properties. In certain embodiments, insulation 18 is formed from a material that will compress approximately 1% at a water depth of 7,200 feet and still have approximately 2.5-3% compressibility remaining and available to absorb the expansion of the trapped water. Thus, the insulation material provides sufficient compressibility so as to allow the expansion of trapped water without breaking the outer shell and sufficient elasticity to provide reliable sealing engagement with the connector.

To facilitate installation of insulating shroud assembly 16 onto connector 10, which is shown in FIGS. 2 and 3, insulating shroud assembly 16 further comprises body 30 and door 32 that are hingeably connected by drive mechanism 34. Assembly 16 also comprises locking mechanism 36 that holds door 32 closed and door face seals 38 that provide sealing engagement between a closure member, i.e. door 32, and body 30 when the door is closed. Door 32 provides sufficient opening for insulating shroud assembly 16 to be installed around flowline jumper 12 above connector 10, then slid onto and around the connector. As shown, door 32 forms less than one-half of insulating shroud assembly 16. The particular angular dimension of door 32 will depend on the size of the tubular member, i.e. flowline jumper 12, that is received within body 30. In certain embodiments, door 32 provides an approximately 135 degree longitudinal opening into body 30.

Referring now to FIG. 2, door 32 is opened such that insulating shroud assembly 16 can be slid onto flowline jumper 12 above connector 10 and moved downward to the position shown in FIG. 1. An ROV pushes insulating shroud assembly 16 into place on flowline jumper 12 and then moves the assembly downward over connector 10 so as to set the seals on body 30. Once insulating shroud assembly 16 is in position, door 32 is rotated by drive mechanism 34 until the door is in the closed position, as shown in FIG. 3. In the closed position, face seals 38 seal door 32 against body 30. Drive mechanism 34 provides sufficient force to close door 32 and energize seals 20, 22, and 38 by compressing insulation 18. The interface between the insulation at seals 20 and 22 also maintains the vertical position of insulating shroud assembly 16 on connector 10. Door 32 is maintained in the closed and sealed position by locking mechanism 36, which may be a ratchet-type mechanism, spring latch mechanism, or some other system for maintaining the closed position of door 32 relative to body 30. Locking mechanism 36 may also include an ROV-operable release to facilitate removal of insulating shroud assembly 16.

Figure 4:
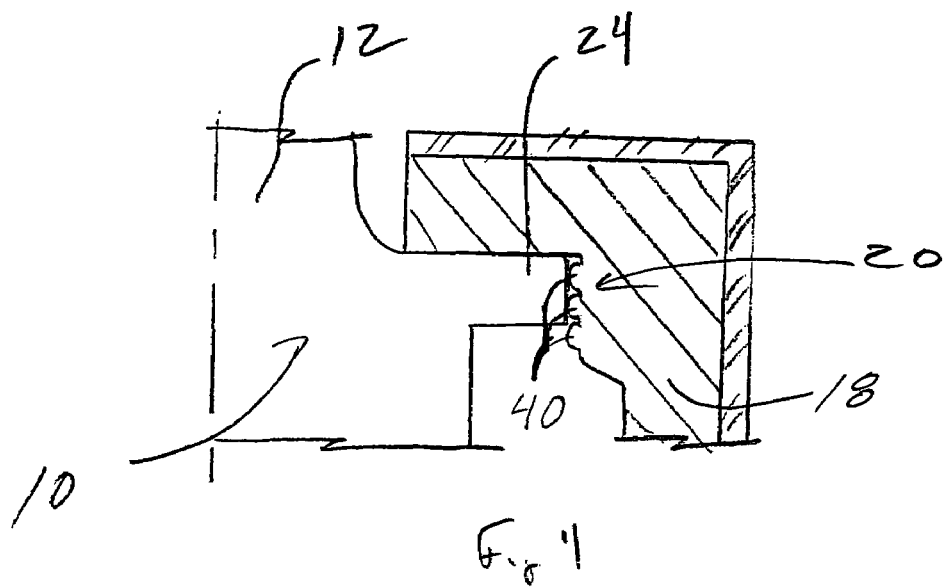
FIG. 4 is a partial cross-sectional view of an upper seal arrangement.

Once in the closed position, body 30 and door 32 are sealed against jumper 12 by upper seal 20, against manifold 14 by lower seal 24, and against each other by face seals 38. The interactions of these seals are more clearly seen in FIGS. 4-6. Referring now to FIG. 4, the engagement of upper seal 20 and flange 24 of flowline jumper 12 is shown. Upper seal 20 preferably comprises three annular protrusions 40 of insulation 18. Annular protrusions 40 project radially inward so that the protrusions are compressed when assembly 16 is installed on connector 10. The plurality of annular protrusions 40 are arranged vertically so as to take into account dimensional tolerances that may effect the position of flange 24 when connector 10 is engaged. Thus, protrusions 40 are arranged such that at least two of the protrusions is compressed against flange 26 to form an annular seal.

Figure 5:
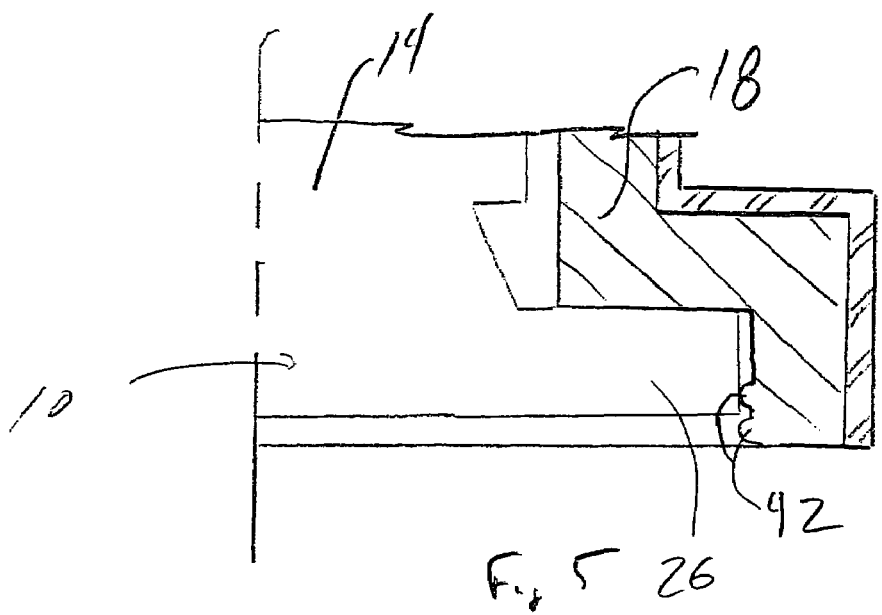
FIG. 5 is a partial cross-sectional view of a lower seal arrangement.

The engagement of lower seal 22 and manifold 14 is detailed in FIG. 5. Lower seal 22 comprises two annular protrusions 42 of insulation 18. Annular protrusions 42 project radially inward from insulation 18 so that the protrusions are compressed when assembly 16 is installed on connector 10. Annular protrusions 42 are arranged vertically so as to take into account dimensional tolerances that may effect the position of flange 26 when connector 10 is engaged. Thus, protrusions 42 are arranged such that at least one of the protrusions is compressed against flange 26 to form an annular seal.

Figure 6:
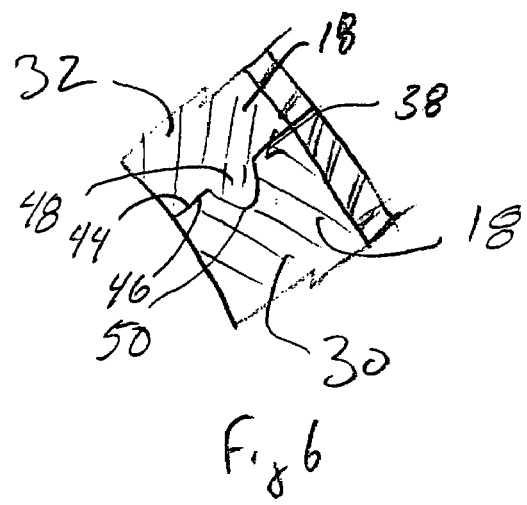
FIG. 6 is a partial cross-sectional seal of a door seal.

Referring now to FIG. 6, the engagement of face seals 38 are shown. Face seal 38 comprises male sealing face 44 disposed on each side of door 32 with a corresponding female sealing face 46 disposed on the sides of the longitudinal opening in body 30. Male sealing face 44 comprises wedged protrusion 48 sized so as to sealingly interface with wedged receptacle 50 on female sealing face 46.

Drive mechanism 34 is shown in FIGS. 7 and 8, where FIG. 8 is a cross-section taken along section line A-A of FIG. 7. Drive mechanism 34 comprises gear assembly 52 connected to shell arms 54 and shell brackets 56. Shell arms 54 are connected to body 30 of insulating shroud assembly 16 and shell brackets 56 are connected to door 32.

Gear assembly 52 comprises planetary gears 58, ring gear 60, and sun gear 62. Sun gear 62 is mounted on shaft 64 and rotated via paddle 66, such as by an ROV. Planetary gears 58 are each mounted to a shaft 68. Sun gear shaft 64 and planetary gear shafts 68 are mounted to shell arms 54. Ring gear 60 is connected to housing 72 that is rotatably supported on torsion plug 70 and held in place by retainer ring 74. Shafts 64 and 68 extend the height of door 32.

In operation, an ROV, or other rotatable actuator, engages paddle 66 so as to rotate shaft 64 and sun gear 62. The rotation of sun gear 62 causes corresponding rotation in planetary gears 58 and ring gear 60. Planetary gears 58 rotate about shafts 68 but maintain their relative positions to sun gear 62. Thus, the rotation of planetary gears 58 causes ring gear 60 to rotates about its central axis, which is coaxial with shaft 64. The rotation of ring gear 60 causes housing 72 to rotate and thus rotates shell brackets 56 and door 32 relative to shell arms 54 and body 30. Gears 58, 60, and 62 also act to provide a mechanical advantage in closing door 32 by increasing the torque that is applied by the ROV to rotate paddle 66. For example, if the ROV can apply 100 ft-lbs. of torque, 600 ft.-lbs. of torque can be applied to door 32. In certain embodiments, other rotatable actuators may take the place of geared drive mechanism 34.

Figure 9:
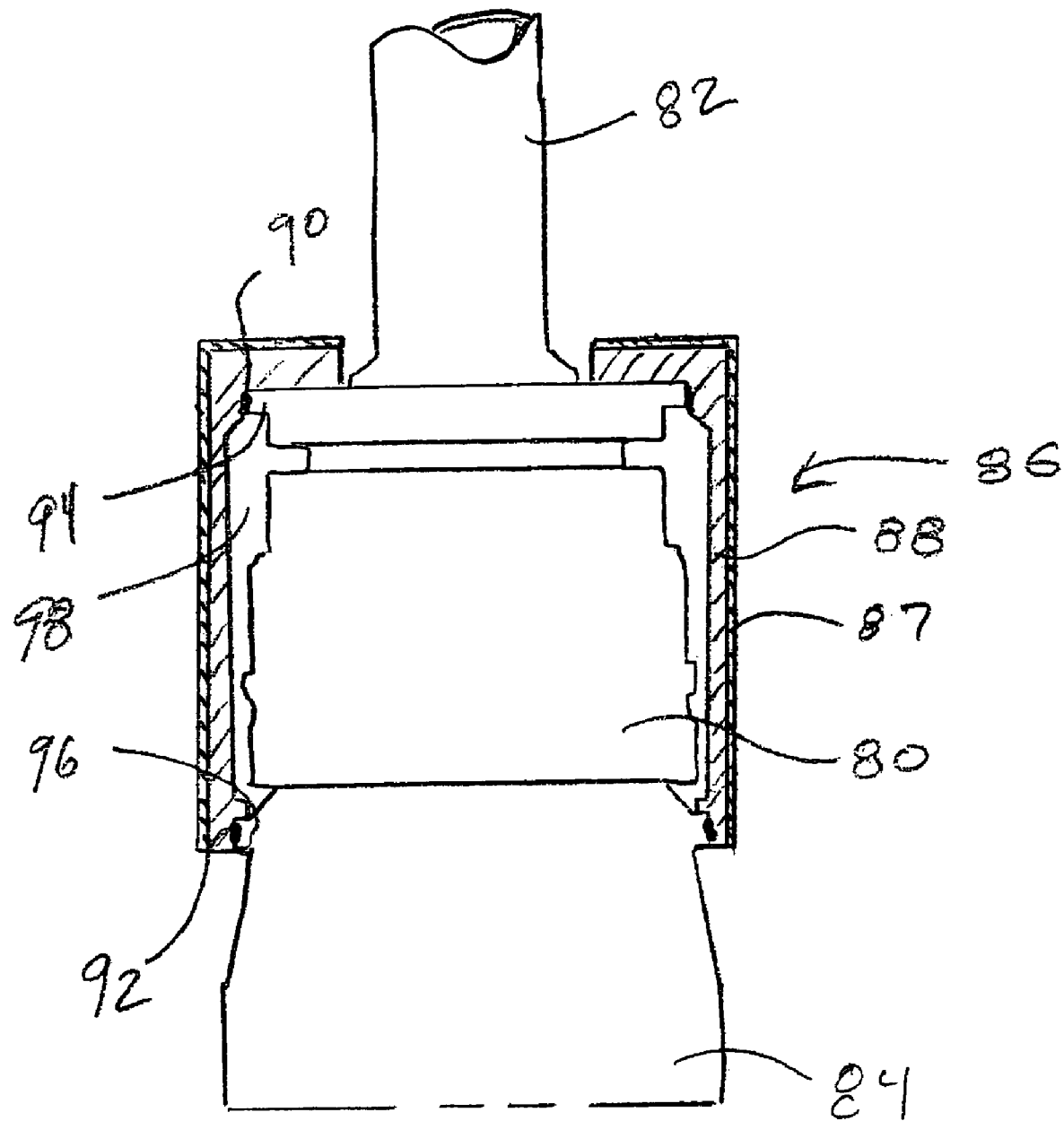
FIG. 9 is a cross-sectional view of a flowline jumper connector with an insulating shroud assembly installed thereon.

Insulating assemblies can be constructed in any number of configurations and arrangements to support insulating different sizes and types of connectors. For example, referring now to FIG. 9, a flowline jumper connector 80 joins a flowline jumper 82 to a manifold 84. Insulating shroud assembly 86 surrounds connector 80 and comprises outer shell 87, insulation 88, upper seal 90, and lower seal 92. Upper seal 90 sealingly engages flange 94 on flowline jumper 82. Lower seal 92 sealingly engages flange 96 of the connector support structure on manifold 84. Thus, seals 90 and 92 form an insulated volume 98 that surrounds connector 80.

Figure 10:
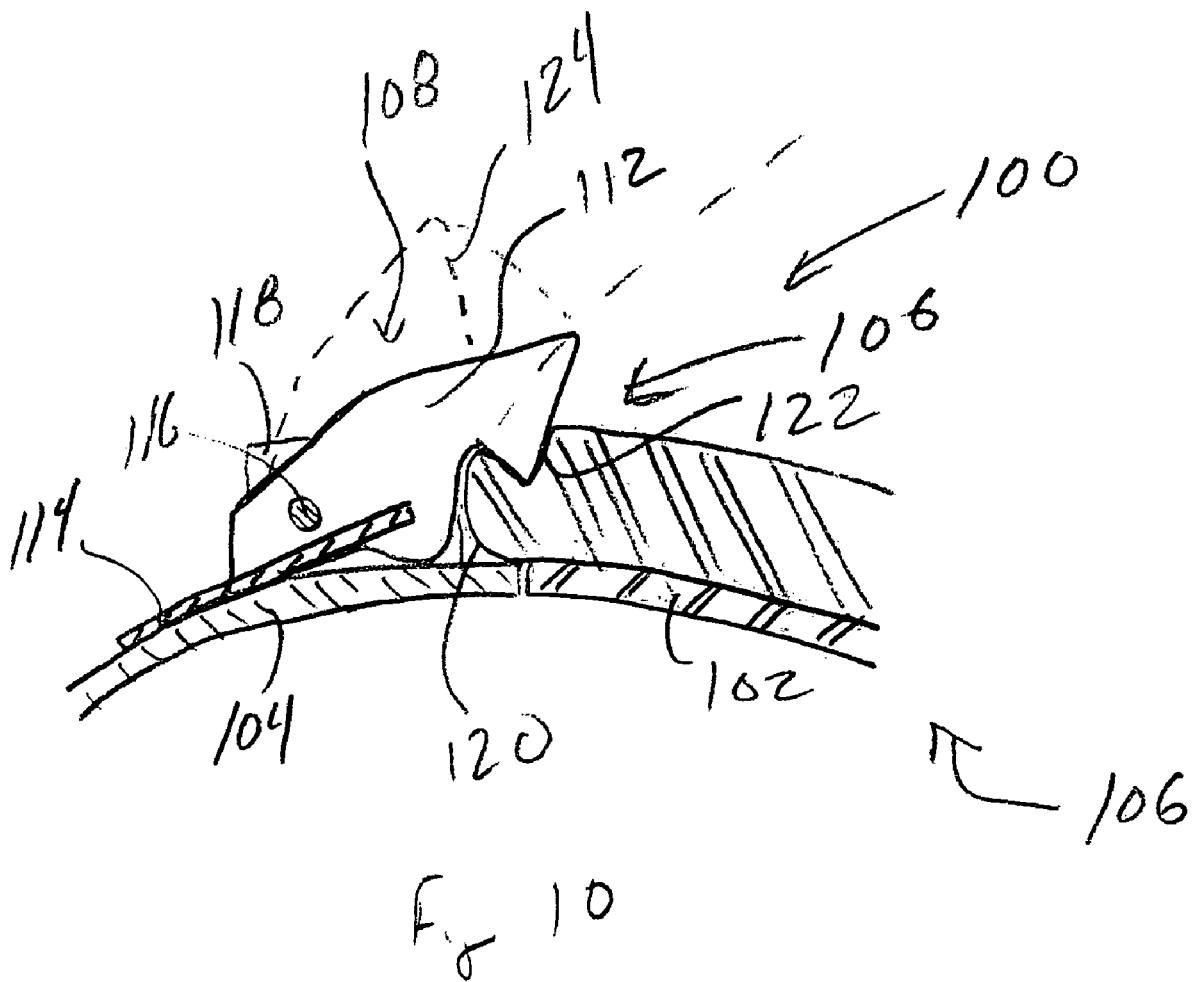
FIG. 10 is a top view of a latching mechanism for use with an insulating shroud.

FIG. 10 illustrates one embodiment of a latching system 100 for use in securing door 102 to body 104 of an insulating shroud assembly 106. Latching system 100 comprises latch assembly 108 and receptacle 110. Latch assembly 108 is mounted to body 104 and further comprises latch 112, spring 114, axle 116, and bracket 118. Receptacle 110 is disposed on door 102 and further comprises cam surface 120 and notch 122. Axle 116 pivotally connects latch 112 to bracket 118, which is fixably connected to body 104. Spring 114 is received within slot 124 on latch 112 and biases the latch to the engaged position shown in FIG. 10.

In the engaged position, latch 112 is received within notch 122 so as to maintain the position of door 102 relative to body 104. Latch system 100 is disengaged by rotating latch 112 counterclockwise about axle 116 and rotating door 102 to an open position. As door 102 is rotated back to the closed position, as shown in FIG. 10, cam surface 120 will engage latch 112. Cam surface 120 causes latch 112 to rotate counterclockwise about axle 116 and allows door 102 to move past the open latch 124 to the closed position. As door 102 fully closes, spring 114 rotates latch 112 clockwise about axle 116 and pushes latch 112 into notch 122. The engagement of latch 112 with notch 122 and the force generated by spring 114 maintains door 102 in the closed position and generates sufficient force to maintain the seals formed between insulating shroud assembly 106 and the connector on which it is installed.

While preferred embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, the relative dimensions of various parts, the materials from which the various parts are made, and other parameters can be varied, so long as the insulating apparatus retain the advantages discussed herein. Accordingly, the scope of protection is not limited to the embodiments described herein, but is only limited by the claims that follow, the scope of which shall include all equivalents of the subject matter of the claims.

What is claimed is:

1. An apparatus for insulating a subsea connector for connecting a first tubular member having a first flange with a second tubular member having a second flange, the apparatus comprising:
   a generally tubular body forming a generally tubular cavity therein adapted to enclose the subsea connector;
   said body having a longitudinal opening adapted to receive the first tubular member;
   a removable closure member for opening and closing said longitudinal opening;
   said body and closure member being lined with insulation; and
   said body and closure member including first and second seals disposed on the insulation sealingly engaging the circumference of the first and second flanges to seal around the connector.

2. The apparatus of claim 1 wherein said insulation is compressible.

3. The apparatus of claim 1 wherein said insulation is at least one and one half inches thick.

4. The apparatus of claim 1 wherein said body includes a hard, non-compliant, and corrosion-proof shell of plastic lined with said insulation.

5. The apparatus of claim 1 wherein said longitudinal opening is less than 180° of the diameter of said generally tubular body.

6. The apparatus of claim 1 wherein said closure member is hinged on said body.

7. The apparatus of claim 1 wherein said seals are made of said insulation.

8. The apparatus of claim 1 wherein said seals are inwardly-directed annular protrusions of said insulation engaging the first and second flanges.

9. The apparatus of claim 1 wherein all parts of said apparatus are made of hard, non-compliant, and corrosion-proof plastic.

10. The apparatus of claim 1 further including a seal extending longitudinally between said removable closure member and said body.

11. The apparatus of claim 1 wherein said removable closure member includes a vertical protrusion received within a vertical recess in said body.

12. An apparatus for insulating a subsea connector for connecting a first tubular member having a first flange with a second tubular member having a second flange, the apparatus comprising:
    a generally tubular body forming a generally tubular cavity therein adapted to enclose the subsea connector and a fluid;
    said body having a longitudinal opening adapted to receive the first tubular member;
    a removable closure member for opening and closing said longitudinal opening;
    said body and closure member being lined with insulation;
    said body and closure member including first and second seals sealingly engaging the first and second flanges to seal around the connector; and
    wherein the generally tubular body allows space between the body and the connector and the volume of said insulation is equal to or greater than the volume of the space in said cavity between the connector and insulation.

13. An apparatus for insulating a connector disposed underwater for connecting a first tubular member having a first flange with a second tubular member having a second flange, the apparatus comprising:
    a generally tubular body forming a generally tubular cavity therein adapted to enclose the connector and a fluid;
    said body having a longitudinal opening adapted to receive the first tubular member;
    a removable closure member for opening and closing said longitudinal opening;
    said body and closure member being lined with insulation;
    said body and closure member including first and second seals sealingly engaging the first and second flanges to seal around the connector; and
    wherein said insulation has sufficient compressibility to allow any trapped water to expand without damaging said body.

14. The apparatus of claim 13 wherein said first and second seals each include a plurality of circumferential seals wherein at least one of said plurality of first seals engages the first flange and at least one of said plurality of second seals engages the second flange to seal the connector.

15. An apparatus for insulating a subsea connector for connecting a first tubular member having a first flange with a second tubular member having a second flange, the apparatus comprising:
    a generally tubular body forming a generally tubular cavity therein adapted to enclose the subsea connector;
    said body having a longitudinal opening adapted to receive the first tubular member;
    a removable closure member for opening and closing said longitudinal opening;

said body and closure member being lined with insulation;
said body and closure member including first and second seals sealingly engaging the first and second flanges to seal around the connector;
wherein said closure member is hinged on said body; and
wherein said body further includes a drive mechanism to open said closure member on said body at said hinge.

16. The apparatus of claim 15 wherein said drive mechanism is actuated by a member adapted to be rotated by a remotely operated vehicle.

17. The apparatus of claim 15 further including a latching mechanism to maintain said closure member in a closed position.

18. An apparatus for insulating a subsea connector for connecting a first tubular member having a first flange with a second tubular member having a second flange, the apparatus comprising:
a generally tubular body forming a generally tubular cavity therein adapted to enclose the subsea connector;
said body having a longitudinal opening adapted to receive the first tubular member;
a closure member for closing said opening that is hinged on said body;
said body and closure member being lined with insulation;
said body including first and second seals for sealing with the first and second flanges to seal around the connector;
said body further includes a drive mechanism to open said closure member on said body at said hinge; and
wherein said drive mechanism includes a gear mechanism providing a closing force of over 100 foot pounds.

19. An apparatus for insulating a subsea connector for connecting a first tubular member having a first flange with a second tubular member having a second flange, the apparatus comprising:
a generally tubular body forming a generally tubular cavity therein adapted to enclose the subsea connector;
said body having a longitudinal opening adapted to receive the first tubular member;
a closure member for closing said opening that is hinged on said body;
said body and closure member being lined with insulation;
said body including first and second seals for sealing with the first and second flanges to seal around the connector;
said body further includes a drive mechanism to open said closure member on said body at said hinge;
a latching mechanism to maintain said closure member in a closed position; and
wherein said latching mechanism includes engaging ratchet teeth on said body and said closure member.

20. An apparatus for insulating a subsea connector for connecting a first tubular member having a first flange with a second tubular member having a second flange, the apparatus comprising:

a generally tubular body forming a generally tubular cavity therein adapted to enclose the connector;
said body having a longitudinal opening adapted to receive the first tubular member;
a closure member for closing said opening that is hinged on said body;
said body and closure member being lined with insulation;
said body including first and second seals for sealing with the first and second flanges to seal around the connector;
said body further includes a drive mechanism to open said closure member on said body at said hinge; and
a latching mechanism to maintain said closure member in a closed position; and
wherein said latching mechanism comprises a spring that biases the latching mechanism to an engaged position.

21. A method of insulating a subsea connector, the method comprising:
receiving a flow line through a longitudinal opening in an insulating shroud;
lowering the insulating shroud around the subsea connector;
sealingly engaging flanges on each side of the connector to seal around the connector;
closing a closure member to close the opening;
latching the closure member closed;
heating and expanding water trapped within said shroud and said closure member wherein insulation hin in said shroud and said closure member has sufficient compressibility to allow any trapped water to expand without damage without damaging said body;
unlatching the closure member; and
opening the closure member to open the longitudinal opening.

22. The method of claim 21 wherein water is trapped around the connector in a cavity in the insulating shroud and the insulation on the insulating shroud is compressed as the water is heated and expands.

23. The method of claim 21 wherein the insulating shroud is made of hard, non-compliant, and corrosion-proof plastic to avoid corrosion subsea.

24. A method of insulating a subsea connector, the method comprising:
receiving a flow line through a longitudinal opening in an insulating apparatus;
lowering the insulating apparatus around the subsea connector;
sealingly engaging flanges on each side of the connector to seal around the connector;
closing a closure member to close the opening;
latching the closure member closed; and
wherein a remote operating vehicle closes the closure member by rotating a gear mechanism between the body and closure member.

* * * * *